Aug. 18, 1964  T. H. EDMUNSON  3,144,782
CHAIN SAW DRIVING SPROCKET ASSEMBLY
Filed Oct. 27, 1961
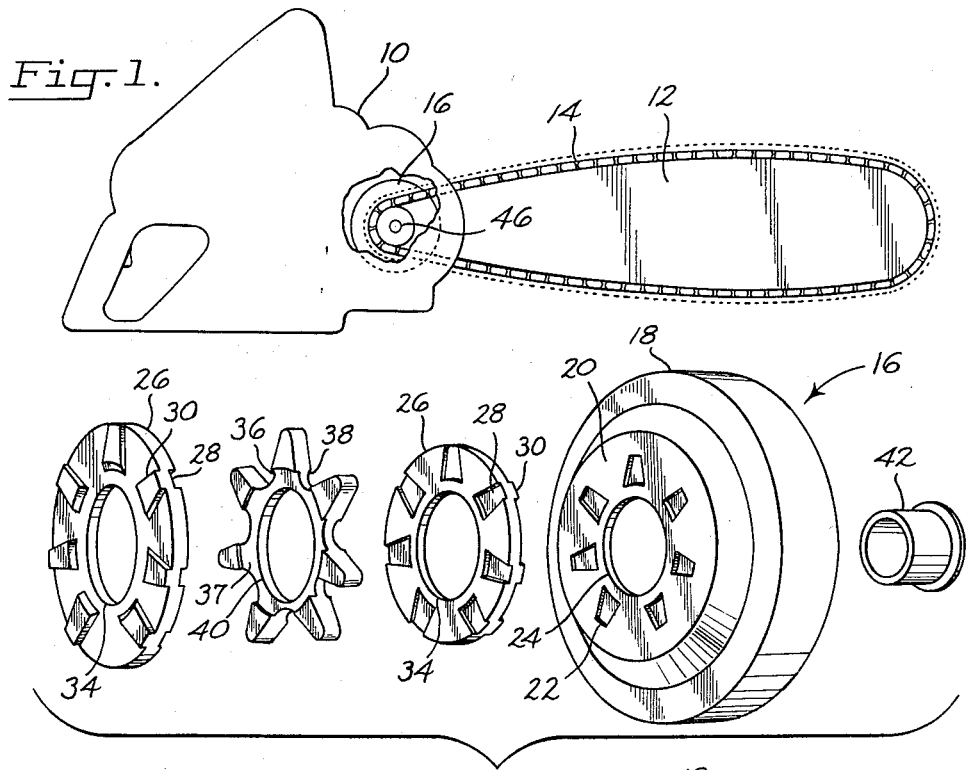
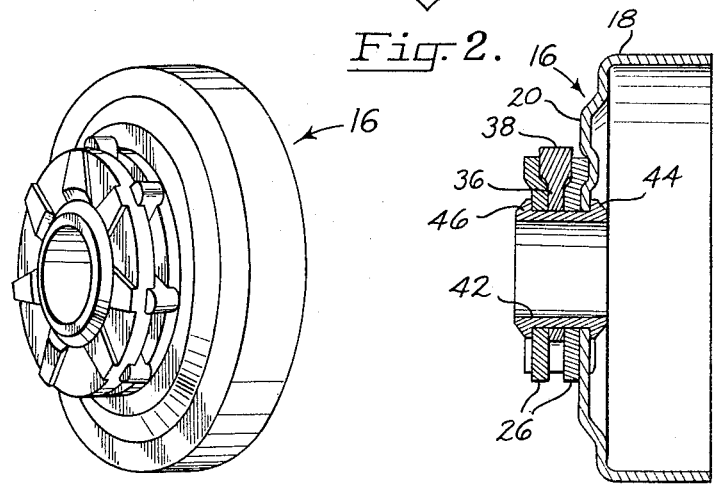
Tillson H. Edmunson
INVENTOR.
BY *Eugene O. Farley*
*Atty.*

United States Patent Office 3,144,782
Patented Aug. 18, 1964

3,144,782
CHAIN SAW DRIVING SPROCKET ASSEMBLY
Tillson H. Edmunson, 1732 SE. Sherrett, Portland, Oreg.
Filed Oct. 27, 1961, Ser. No. 148,098
4 Claims. (Cl. 74—243)

This invention relates to new and useful improvements in driving sprockets and more particularly is concerned with an improved driving sprocket assembly for chain saws.

As is well known, chain saws presently in use comprise a power unit for driving an endless chain around a projecting saw bar. The drive connection between the power unit and the saw chain comprises a machined sprocket wheel. The saw chain requires occasional replacement due to normal wear and damage, and it is the present custom to install new chains but not the drive sprockets, due to their high cost, unless the latter are completely worn. Thus, in most instances, new saw chains are installed on worn sprockets and this causes inefficient operation of the new chain as well as immediate damage therto.

Accordingly primary objects of the present invention are to provide an improved drive sprocket assembly for connection between a power unit of a chain saw and a saw chain and more particularly to provide such an assembly which is inexpensive to manufacture and assemble and therefore can be installed with each new saw chain to prolong the useful life of the latter.

More specifically, it is an object to provide a chain saw drive connection which is designed to be produced entirely by punch press or like methods and which is readily assembled to minimize time of assembly and to facilitate installation in a chain saw.

Briefly stated, the drive sprocket of the present invention comprises an assemblage including a conventional clutch cup modified for the purposes of the present invention, a sprocket wheel or toothed member, a pair of sprocket wheel retaining members, and a sleeve retainer operative to provide for a bearing for the unit as well as to hold the parts in assembled relation. In accordance with the objects above enumerated, the various parts of the driving sprocket assembly are readily produced such as by means of a punch press and include cooperating recesses and lugs to provide a drive connection therebetween.

The invention will be better understood and additional objects will become apparent from the accompanying specification and claims considered together with the accompanying drawings wherein like numerals of reference indicate like parts and wherein:

FIGURE 1 is a perspective view of a chain saw in reduced scale having the present driving sprocket assembly incorporated therein;

FIGURE 2 is an exploded perspective view of the present driving sprocket assembly;

FIGURE 3 is a prespective view of the present sprocket in assembled relation; and FIGURE 4 is a central cross sectional view of the sprocket assembly.

Referring now in detail to the drawings and first to FIGURE 1, the present drive sprocket assembly is intended for use on a chain saw employing a power unit 10, a saw bar 12, and a continuous saw chain 14 which operates around the bar 12. As stated above, the drive connection between the power unit and the saw chain in conventional units comprises a machined sprocket wheel, and FIGURE 1 shows the present assembly, designated generally by the numeral 16, substituted for such sprocket wheel.

The driving sprocket assembly 16 comprises first a clutch cup or drum 18. This cup forms one element of a conventional clutch assembly on the saw, not shown, and for the purposes of the present invention, this cup is modified in that the closed face 20 thereof is provided with a plurality of recesses or indentations 22, these recesses being concentrically disposed around a central opening 24 in the face 20.

Included in the present assembly is a pair of identically formed sprocket wheel retaining members or washers 26 which, as illustrated, are circular in construction and are formed with recesses or indentations 28 on one side which preferably are pressed partially through the retainer to form lugs or projections 30 on the opposite face. Recesses 28 are selectively located such that their projections 30 are adapted to be received in recesses 22 of the clutch cup when a retaining member 26 is brought into face-to-face relation with the closed face 20 of the clutch cup 18. Retaining members 26 have central openings 34 which in assembled relation are in axial registry with central opening 24 of element 18.

Also forming a part of the assembly is a sprocket wheel 36 of which the central portion 37 of which is thinned to provide laterally thickened teeth 38 adapted for reception in recesses 28 of the retaining members 26. Sprocket wheel 36 also has a central opening 40 which in assembled relation of the parts is in axial registry with the central openings of the other members.

Teeth 38 are preferably case hardened to prolong the life thereof and also preferably are of a length to project slightly beyond the outer periphery of the retaining members 26 to provide maximum engagement therewith by the saw chain links.

The device includes a bearing retainer 42 comprising a sleeve of an outer diameter adapted for a clearance fit in the central openings of the various members. Sleeve 42 serves first as mounting means for mounting the sprocket assembly, through the intermediary of its central opening, on a standard bearing or shaft, not shown, in the chain saw motor unit and second as support means for the parts 18, 26, and 36, as well as means for holding these parts together in assembled relation.

To serve this latter function, i.e. to hold the parts in assembled relation, the sleeve 42 is provided with end upsets 44 and 46 and for the purpose of asesmbly, it is provided first with the upset 44, then inserted in place, and then provided with the upset 46 at the other end, thereby to hold the parts securely together. The assembled unit is shown in FIGURES 3 and 4.

It will be apparent that the various elements of the present sprocket assembly may be manufactured by mass production methods such as punch pressing or stamping from sheet metal, and since they do not require any machining or other expensive or time consuming processes, they can be manufactured very economically. Upsetting or heading of the sleeve 42 to hold the parts assembled also is readily accomplished by punch press means. Thus, the cost of the present sprocket assembly will be sufficiently low that the assembly can be replaced every time the saw chain is replaced and thus eliminate the conventional practice of installing a new chain on a worn sprocket. The inclusion of a new sprocket assembly with every new chain will increase the normal life of these high cost chains and the savings achieved will pay for the new sprocket assembly many times over.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A driving sprocket assembly for providing a drive connection between a chain saw power unit and a saw chain, comprising a cup-shaped clutch element adapted to be driven by the power unit and having a closed face provided with recesses, first and second sprocket wheel retaining members having projections on one surface and indentations on the other surface, the sprocket wheel retaining members being disposed in the assembly with the indentations facing each other and the projections facing outwardly whereby the projections on one of the retaining members engages the recesses in the clutch element for providing a drive connection, and a sprocket wheel disposed between the retaining members adapted for meshing engagement with the saw chain, the sprocket wheel having toothed portions and oppositely extending lateral enlargements on the toothed portions engaging the recesses in the first and second retaining members for providing a drive connection therebetween.

2. The driving sprocket assembly of claim 1 wherein the sprocket wheel, retaining members and clutch element each has a central opening, and a sleeve received in the openings serving to support the sprocket wheel and retaining members on the clutch element.

3. The driving sprocket assembly of claim 1 wherein the sprocket wheel, retaining members and clutch element each has a central opening, and a sleeve received in the opening serving to support the sprocket wheel and retaining members on the clutch element, the sleeve having end upsets holding the parts assembled in their driving connections.

4. The driving sprocket assembly of claim 1 wherein the teeth of the sprocket wheel are of a length to extend beyond the peripheral surface of the retaining members.

References Cited in the file of this patent

UNITED STATES PATENTS

| 2,799,174 | Pelletoer | July 16, 1957 |
| 3,045,502 | Carlton | July 24, 1962 |

FOREIGN PATENTS

| 871,398 | France | Jan. 15, 1942 |